United States Patent [19]
LaBorde et al.

[11] Patent Number: 5,482,727
[45] Date of Patent: Jan. 9, 1996

[54] METHOD FOR IMPROVING THE COLOR OF CONTAINERIZED GREEN VEGETABLES

[75] Inventors: Luke F. LaBorde; Joachim H. von Elbe, both of Madison, Wis.

[73] Assignee: Friday Canning Corporation, New Richmond, Wis.

[21] Appl. No.: 279,241

[22] Filed: Jul. 21, 1994

[51] Int. Cl.$^6$ ..................................................... A23L 1/272
[52] U.S. Cl. ............................................................ 426/270
[58] Field of Search ............................................. 426/270

[56] References Cited

U.S. PATENT DOCUMENTS

| | | |
|---|---|---|
| 4,104,410 | 8/1978 | Malecki . |
| 4,473,591 | 9/1984 | Segner et al. . |
| 4,563,364 | 1/1986 | Carmichael et al. ..................... 426/510 |
| 4,615,924 | 10/1986 | Hekal et al. . |
| 4,701,330 | 10/1987 | Rogers et al. . |
| 4,810,512 | 3/1989 | Kratky et al. . |
| 5,114,725 | 5/1992 | Leake et al. . |

OTHER PUBLICATIONS

1986 Green Bean Veri–Green Process Parameters and List of Acceptable Varieties, Continental Food Packaging, Dec. 11, 1985.
*Chemistry of Color Improvement in Thermally Processed Green Vegetables*, J. H. von Elbe and L. F. LaBorde, Chemistry of Color Improvement, Chap. 2, pp. 12–28 (1989).
*Calcium Ions Protect Beet Root Cell Membranes against Thermally Induced Changes*, Y. Toprover and Z. Glinka, Thermally Induced Membrane Changes and Calcium, Physiol. Plant. 37:131–134 (1976).
*Further Studies on Factors Affecting the Efflux of Betacyanin from Beet Root: A Note on Thermal Effects*, S. M. Siegel, Physiologia Plantarum, vol. 22, pp. 327–331 (1969).
*Effects of water blanching on pea seeds*, J. D. Selman and E. J. Rolfe, J.Fd Technol, vol. 14, pp. 493–507 (1979).
*The Interfacial Factor in the Heat–Induced Conversion of Chlorophyll to Pheophytin in Green Leaves*, D. R. Haisman and M. W. Clarke, J. Sci. Fd Agric., vol. 26, pp. 1111–1126 (1975).
*Spectrophotometric Study of the Green Color in Okra*, H. Fischbach and S. H. Newburger, Metals in Pigment of Akra, vol. 26, No. 1, pp. 134–139 (1943).

*Federal Register*, vol. 51, No. 49, p. 87 (Mar. 13, 1986).
*Chlorophyll Degradation and Zinc Complex Formation with Chlorophyll Derivatives in Heated Green Vegetables*, L. F. LaBorde and J. H. von Elbe, Journal of Agricultural and Food Chemitry, vol. 42, No. 5, pp. 1100–1103 (1994).
Effect of Solutes on Zinc Complex Formation in Heated Green Vegetables, L. F. LaBorde and J. H. von Elbe, Journal of Agricultural and Food Chemistry, vol. 42, No. 5, pp. 1096–1099 (1994).
*Pigment Composition and Color of Conventional and Veri–Green Canned Beans*, L. F. LaBorde et al., Journal of Agricultural and Food Chemistry, vol. 34, No. 1, pp. 52 . 54 (1986).
*Zinc Complex Formation in Heated Vegetable Purees*, L. F. LaBorde and J. H. von Elbe, Journal of Agricultural and Food Chemistry, vol. 38, No. 2, pp. 484–487 (1990).
*Kinetics of the Formation of Zinc Complexes of Chlorophyll Derivatives*, L. H. Tonucci and J. H. von Elbe, Journal of Agricultural and Food Chemistry, vol. 40, No. 12, pp. 2341–2344 (1992).
*Softening of Cooked Snap Beans and other Vegetable in Relation to Pectins and Salts*, M. L. Fishman and J. J. Jen Eds., Chemistry and Function of Pectins, American Chemical Society, pp. 190–199 (1986).
*Water Permeability of Plant Cuticles: The Effect of Temperature on Diffusion of Water*, J. Schönherr, et al., Planta, pp. 21–26 (1979).

*Primary Examiner*—Donald E. Czaja
*Assistant Examiner*—Choon P. Koh
*Attorney, Agent, or Firm*—Frost & Jacobs

[57] ABSTRACT

There is provided a method for improving the color of containerized green vegetables, comprising the steps of: (a) blanching the vegetables for an extended period of time; (b) packing the blanched vegetables into a container along with an aqueous packing solution containing zinc or copper ions; (c) sealing the container; and (d) subjecting the containerized vegetables and packing solution to a sterilization process. Alternatively, the method may comprise the steps of: (a) holding the vegetables at an elevated temperature for a predetermined period of time; (b) blanching the vegetables with an aqueous blanching solution containing zinc or copper ions; (c) packing the blanched vegetables into a container along with an aqueous packing solution; (d) sealing the container; and (e) subjecting the containerized vegetables and packing solution to a sterilization process.

20 Claims, No Drawings

METHOD FOR IMPROVING THE COLOR OF CONTAINERIZED GREEN VEGETABLES

BACKGROUND OF THE INVENTION

1. Field of the Invention

This invention relates to a method for improving the color of containerized green vegetables, particularly to a method of preserving the green color of heat processed canned green vegetables such as green beans and peas.

2. Description of Related Art

Containerized (i.e., canned) vegetables normally must be subjected to heat processing in order to promote sterility and prolong shelf life. While these processes ensure that the vegetables will have an appropriate shelf life and will be safe for human consumption, this processing can result in adverse effects such as changes in the color of the vegetables. In fact, a recent study has suggested that the loss of green color in canned vegetables has led to a reduction in the per capita consumption of these products.

The conventional method for processing containerized green vegetables essentially comprises the steps of blanching the vegetables in water at 60° to 100° C. for 1–5 minutes, followed by packing the vegetables into a container along with an aqueous solution optionally having small amounts of added sugar and/or salt, and thereafter, subjecting the containerized vegetables to a sterilization process. The purpose of the blanching step is to remove occluded or dissolved oxygen from the vegetables (for proper vacuum maintenance after sealing), activate or inactivate certain enzymes that may affect product quality, soften the vegetable tissue to aid in packing, and/or cleanse the vegetables. For green beans, blanching temperatures of 60° to 80° C. are preferred in order to activate the enzyme pectin methyl esterase, thereby providing a firmer product after processing and preventing sloughing. Blanching may also be performed using steam. In this method, the vegetables are placed on a conveyor belt, and transported through a closed tunnel wherein steam is sprayed over the vegetables (usually for 1–5 minutes also). The sterilization step generally involves heating the sealed containers to a high temperature for a predetermined period of time. For example, typical sterilization steps for canned green beans involve heating to a temperature of approximately 250° F. for about 10 minutes (#303 can).

The above-described conventional process for canned green vegetables suffers from several drawbacks, chief among them being a significant loss of the natural green color of the vegetables. The loss in green color is associated with a reduction in the amount of chlorophyll present in the vegetables. In fact, the blanching and sterilization steps sometimes reduce chlorophyll content by as much as 80 to 100%. The principle manner by which the chlorophyll in the vegetables is lost is by the degradation of green-colored chlorophyll to olive-brown pheophytin and pyropheophytin. Obviously, an olive-brown colored vegetable does not appear pleasing to the eye, and consumer acceptance is thereby greatly diminished.

The degradation of chlorophyll within plant tissues is initiated by heat-induced decompartmentalization of cellular acids as well as the synthesis of new acids. The resulting increase in acidity of the vegetables after heating, as demonstrated by decreases in pH, results in the displacement of the central magnesium ion of chlorophyll by hydrogen ions to form olive-brown pheophytin. Further heating can result in the replacement of the C-10 carbomethoxy group of pheophytin with another hydrogen ion resulting in the formation of olive-colored pyropheophytin. Thus, the degradation of chlorophyll into these compounds results in an undesirable olive-brown color for the vegetables.

Various methods have been employed in the past to prevent containerized green vegetables from losing their natural green color due to the degradation of chlorophyll. Since the release and formation of acids within the vegetables directly contribute to the degradation of chlorophyll into pheophytin and pyropheophytin, various attempts have been made to increase the pH of the vegetables. For example, alkalizing agents have been employed to maintain an elevated pH, thereby preventing the degradation of chlorophyll. Some of these methods have even incorporated the alkaline compounds in the interior lining of the cans in order to maintain the proper pH. All of these approaches, however, suffer from numerous drawbacks, including changes in the flavor, odor, and texture of the vegetables. In addition, the alkalizing agents are usually not effective in neutralizing tissue acids over long periods of storage.

Others have attempted to retain the natural green color by processing the vegetables at higher than normal temperatures for shorter periods of time. While this often results in a more pleasing color immediately after processing, pH reductions during storage eventually result in a loss of chlorophyll similar to that seen for vegetables conventionally processed. U.S. Pat. No. 4,104,410 even eliminates the blanching step entirely, replacing this step with a hot water wash at a temperature well below conventional blanching temperatures. In fact, the inventor in this patent stated that the blanching process itself is the principle cause for the loss of color in canned green vegetables.

The other approach commonly used to prevent loss of green color in canned vegetables is to replace the magnesium ion of chlorophyll with another metal. When the magnesium ion in vegetable chlorophyll is replaced by a zinc or copper ion, zinc and copper pheophytins and pyropheophytins are formed. These zinc and copper complexes have a green color similar to that of chlorophyll, and are considerably more stable in acidic solutions. Thus, hydrogen ions will not replace the zinc or copper present in these complexes, and the olive-brown pheophytin and pyropheophytin will not be formed. This "regreening" effect of copper and zinc ions has been known since the 1940's, and several processes have been developed which exploit this effect. For example, U.S. Pat. No. 4,473,591 discloses a process in which zinc or copper ions are provided in the blanch solution. In this process, also known as the Veri-Green process, the vegetables are blanched in the usual fashion however 100 to 200 ppm of zinc or copper ions are present in the blanch water. It is stated that the addition of the metal ions result in vegetables that are greener than those conventionally processed. In addition, it is stated that further enhancement of the color can be achieved by providing an alkaline earth metal compound coated upon the inner surface of the container.

The process disclosed by U.S. Pat. No. 4,473,591, however, also suffers from several drawbacks, chief among them being an inability to precisely control the amount of zinc or copper which will be present in the containerized vegetables. Food additives are highly regulated by the FDA, and in fact the addition of copper ions to vegetables is currently not permitted in the U.S. While the addition of zinc ions to vegetables is permitted by the FDA, zinc is only permitted in green beans up to a level of 75 ppm or less (total concentration of zinc in can). Since the amount of zinc in the final containerized product is difficult to control when zinc ions are added directly to the blanch water, one must usually employ lower than optimal levels of zinc to ensure compliance with the applicable standard.

U.S. Pat. No. 5,114,725 discloses another process by which zinc or copper ions may be incorporated into containerized green vegetables. In this process the well known method of providing zinc or copper ions in the brine solution of canned green vegetables is employed. The vegetables are first blanched under conventional conditions and then filled into cans where a small aliquot of a concentrated zinc solution is added along with the brine solution. The zinc ions are preferably present at a level between 40 ppm and 75 ppm, the upper limit corresponding to the current permissible concentration as set by the FDA. After the cans are sealed, they are held at an elevated temperature of between 125° and 175° F. for 30 to 60 minutes. The canned green vegetables are then subjected to a plurality of thermal treatments. In other words, the sealed containers are subjected to thermal exposure beyond that which is necessary for commercial sterility. This reportedly results in an improvement in the green color of the vegetables.

Unfortunately, all of the prior art processes have drawbacks. For instance, none of the prior art methods utilizing zinc ions have resulted in thermally processed peas with an acceptable, storage-stable green color and a zinc ion concentration below 75 ppm. Adding zinc directly to the blanch solution creates difficulties in controlling the final zinc concentration, and it has also been found that zinc uptake in pea tissue from a brine solution containing zinc ions is small compared to zinc uptake from a blanch solution containing the metal ions.

SUMMARY OF THE INVENTION

It is an object of the present invention to provide a method for improving the color of containerized green vegetables, including green beans, peas, spinach, and asparagus.

It is another object of the present invention to provide a method for improving the green color of containerized vegetables, wherein zinc or copper ions replace the magnesium ion of chlorophyll in order to form zinc or copper pheophytins and pyropheophytins.

It is yet another object of the present invention to provide a method for improving the green color of containerized vegetables, wherein the vegetables are first subjected to an extended heat treatment prior to exposure to zinc or copper ions either in the blanch solution or the brine solution.

The foregoing objects can be accomplished in accordance with one aspect of the present invention by providing a method for improving the color of containerized green vegetables, comprising the steps of: (a) blanching the vegetables for an extended period of time; (b) packing the blanched vegetables into a container along with an aqueous packing solution containing zinc or copper ion; (c) sealing the container: and (d) subjecting the containerized vegetables and packing solution to a sterilization process. The blanching step may be accomplished either by placing the vegetables in an aqueous solution (perferably deionized water) or by bathing the vegetables in steam. These two blanching methods are conventional in nature, however the duration is extended beyond that previously employed. The vegetables are preferably blanched in a solution comprising deionized water for at least about 10 minutes at a temperature of between about 60° and 100° C. The packing solution preferably comprises deionized water and zinc chloride, and the concentration of zinc ions in the packing solution is preferably at least about 100 ppm, more preferably about 150 ppm. When the vegetables are peas, the blanching is preferably performed at a temperature between about 60° and about 100° C. for at least about 20 minutes. When the vegetables are green beans, the blanching is preferably performed for at least 30 minutes. The method described above may also include the step of holding the vegetables at an elevated temperature for a predetermined period of time immediately prior to the sterilization process.

The foregoing objects of the present invention may also be achieved by providing a method for improving the color of containerized green vegetables comprising the steps of: (a) holding the vegetables at an elevated temperature for a predetermined period of time; (b) blanching the vegetables with an aqueous blanching solution containing zinc or copper ions; (c) packing the blanched vegetables into a container along with an aqueous packing solution; (d) sealing the container; and (e) subjecting the containerized vegetables and packing solution to a sterilization process. The pre-blanch hold step may be accomplished by placing the vegetables in water, preferably deionized, at a temperature of at least 60° C. for at least about 10 minutes. Alternatively, the pre-blanch hold may be accomplished by bathing the vegetables in steam for at least 10 minutes. The blanching solution preferably comprises deionized water and zinc chloride. When the vegetables being processed are green beans, the concentration in the blanching solution is preferably at least 500 ppm, and when the vegetables are peas, the concentration is at least about 30 ppm.

DESCRIPTION OF THE PREFERRED EMBODIMENT

Applicants have discovered that the color of containerized green vegetables can be improved by first subjecting the vegetables to an extended heat treatment prior to exposure to zinc or copper ions. The metal ions may be provided either in the blanch solution, or by packing the vegetables in a brine solution containing the metal ions, and will replace the magnesium ion of chlorophyll in the manner previously described. If the metal ions are present in the blanch solution, the vegetables are first subjected to a pre-blanch hold in an aqueous solution (or steam) at an elevated temperature. Alternatively, the vegetables may be subjected to an extended blanch (either in water or steam) prior to packing the vegetables in a brine solution containing the metal ions. Applicants believe that the extended heat treatment increases the permeability of the zinc or copper ions into the plant tissue, thereby increasing the zinc or copper complex formation during retorting. This results in a more effective utilization of the zinc or copper in the desired formation of zinc or copper pheophytins and pyropheophytins, which are storage-stable green complexes which preserve the overall green appearance of the vegetables. Applicants' method may be employed in the canning of any green vegetable which contains chlorophyll, such as green beans, peas, spinach and aspargus. Both the extended blanch and the pre-blanch hold may also be accomplished by bathing the vegetables in steam for the appropriate period of time as an alternative to merely placing the vegetables in the heated solution.

Example 1

One embodiment of the method of the present invention was employed by placing 200 grams each of fresh green beans and peas in metal containers having 600 mL of heated distilled water therein. The temperature of this pre-blanch hold water was maintained using a temperature-controlled waterbath. Come-up time was held to less than 30 seconds by tempering the vegetables in a separate container of heated water for 15 seconds. Pre-blanch hold parameters are given in Table 1 below, wherein G represents green bean samples, and P represents pea samples.

TABLE 1

| Sample | Water Temp. (°C.) | Hold Time (min.) |
| --- | --- | --- |
| G1 | 25 | 30 |
| G2 | 45 | 30 |
| G3 | 65 | 30 |
| G4 | 85 | 20 |
| G5 | 100 | 20 |
| P1 | — | 0 |
| P2 | 65 | 30 |

After the pre-blanch hold of Table 1, the samples were immediately cooled for 30 seconds under flowing deionized water. Each of the samples for the same type of vegetable were then blanched together by loosely packing each sample in 3 mm mesh nylon bags. The green bean samples were blanched in water containing 1500 ppm $Zn^{2+}$ (as zinc chloride) at 100° C. for 3 minutes. Peas were blanched in water containing 45 ppm $Zn^{2+}$ at 100° C. for 5 minutes. Higher zinc concentrations are employed for green beans because green beans are less permeable to $Zn^{2+}$ ions than are peas, and the blanch times employed are those typically employed in the canning industry. Samples of blanched vegetables were retained for subsequent testing. After blanching, the vegetables were rinsed in deionized water for 30 seconds, packed into #211 X 304 cans (125 grams), filled with deionized water at room temperature, and mechanically sealed. The cans were then heated in a still retort at 116° C. for 30 minutes (plus a come-up time of approximately 2 minutes), and then cooled under flowing cold water.

In order to analyze the amount of chlorophyll a remaining and zinc complexes formed, HPLC was performed on the samples. Chlorophyll b was not followed because chlorophyll a is present at greater concentrations in plant tissue and is more reactive. The zinc complexes were calculated as the combined concentration of zinc pheophytin a and zinc pyropheophytin a [ZnPa], and the spectral characteristics of each were assumed to be identical. The vegetables were first pureed in a food processor for 30 seconds. Pigments were then extracted by blending 30 grams of the puree with 60 mL of acetone for 1.5 minutes. The extract was then mixed with 15 grams of celite and vacuum filtered. The residue was then washed with an additional 150 mL of acetone until colorless, and was brought to volume in a 250 mL volumetric flask with additional acetone. The extract was then filtered through a 0.2 μm filter prior to injection onto a Nova-Pak C18 Radial-Pak cartridge HPLC column (available from Waters Associates Co., Milford, Mass.). The solvent system employed comprised ethyl acetate:methanol:water in a ratio of 4:5.4:1 (w/v). Pigments were monitored at 658 nm on a Waters Model 440 dual-wavelength detector and integrated on a Waters 740 data module.

The concentration of $Zn^{2+}$ in the samples was determined by first drying the vegetables under vacuum at 70° C. for 16 hours, and then grinding to a fine powder using a mortar and pestle. The samples were then analyzed using an inductively-coupled plasma emission spectrophotometer to determine the $Zn^{2+}$ concentration. The results of the HPLC and $Zn^{2+}$ analysis are shown in Table 2 below. It should be noted that the chlorophyll a and $Zn^{2+}$ values in Table 2 are from samples taken prior to the sterilization step. The ZnPa (zinc pheophytin a+ zinc pyropheophytin a) concentration was measured after the sterilization step. The amount of chlorophyll a in fresh green beans and peas (i.e., unprocessed) was also measured using identical methods, and found to be 5.7 and 5.0 μMol/100 g, respectively.

TABLE 2

| Sample | Chlorophyll a (μMol/100 g) | $Zn^{2+}$ (μMol/g) | ZnPa (μMol/100 g) |
| --- | --- | --- | --- |
| G1 | 4.2 | 1.1 | 2.0 |
| G2 | 4.0 | 1.1 | 2.0 |
| G3 | 2.5 | 1.2 | 3.1 |
| G4 | 1.9 | 1.3 | 3.6 |
| G5 | 0.8 | 2.1 | 5.9 |
| P1 | — | 1.4 | 1.6 |
| P2 | — | 1.9 | 2.5 |

As the results above indicate, the use of a pre-blanch hold significantly increases the amount of zinc complexes formed, thereby resulting in an improved, storage-stable green color for the canned vegetables. Zinc uptake by the vegetables was also shown to increase with the use of the pre-blanch hold. The amount of zinc complexes formed, however, was higher than would be expected based solely upon the amount of zinc uptake. Additionally, as the temperature of the pre-blanch hold is increased, the concentration of the desired zinc complexes also increases. In green beans, for example, optimal results were obtained at or above 65° C.

Applicants performed similar testing as that reported in Example 1 above in order to determine other optimal parameters for their invention. In the case of blanching in a zinc ion-containing solution, it was found that the use of deionized water for both the pre-blanch hold and the blanch itself increased zinc uptake and vegetable color. The effect of deionized water was most pronounced in the blanch itself, as the use of deionized water in the pre-blanch hold had a less significant effect. Likewise, zinc uptake and color were not significantly different when the pre-blanch hold pH was 5.0 or 7.0 (pH adjusted using HCl and NaOH). Significant improvements were noted, however, when blanching at a pH of 5.0 rather than 7.0. The pH effects are attributable to the fact that zinc ions are more soluble at a lower pH. At a pH less than about 5, however, the desired chelating reaction begins to slow noticeably.

Example 2

The procedures of Example 1 were repeated with fresh peas (sieve size 3). The peas were subjected to a pre-blanch hold in deionized water (1:3 w/v) at 65° C. for 0, 20, 40 or 60 minutes, and were then cooled in flowing deionized water for 15 seconds. This was followed by blanching in a $ZnCl_2$ solution (1:10 w/v) containing 0, 30, 45 or 60 ppm $Zn^{2+}$, at 100° C. for 5 minutes. The blanched peas were then packed into #303 X 406 cans (312 grams), filled with water at 100° C., and mechanically sealed. The cans were heated in a stationary retort at 116° C. for 35 minutes, and then immediately cooled under flowing cold water. The sterilization time employed was the minimum required to achieve commercial sterility at the selected temperature.

Pigment and $Zn^{2+}$ analysis was performed in the manner described previously. Colorimetry tests were preformed by placing pureed samples in a 5 cm plexiglass cup to a depth of approximately 3 cm. The sample cup was then placed on the light port of a Hunter Lab D-25A-9 colorimeter (available from Hunter Associates Laboratory, Inc., Reston, Va.), and covered to avoid stray light. CIE L* (lightness), −a* (green), and b* (yellow) values were determined by rotating the cup 90° for each measurement and averaging the results. Values for hue (h), saturation (C), and total color difference as compared to fresh peas (ΔE) were calculated according to the following formulas:

$$h = \tan^{-1}(b^*/a^*) \quad C = (a^{*2} + b^{*2})^{1/2}$$

$$\Delta E = [(L^*_1 - L^*_2)^2 + (a^*_1 - a^*_2)^2 + (b^*_1 - b^*_2)^2]^{1/2}$$

Processed peas were also evaluated for green color, uniformity of color, and overall product acceptance by 8 experienced panelists. A scale of 0 to 10 was used for each of these characteristics. Samples were randomly displayed under a standard fluorescent light used for grading canned vegetables. Results of Applicants' testing are shown in Tables 3 and 4 below. ZnPa concentrations are calculated on a fresh weight basis, and the total $Zn^{2+}$ concentration represents the amount of zinc in the entire can. It should also be noted that no chlorophyll was found in any of the samples.

TABLE 3

| Sample | Pre-Blanch Hold (min.) | Blanch $Zn^{2+}$ (ppm) | ZnPa nMol/g | Total $Zn^{2+}$ |
|---|---|---|---|---|
| S1 | 0 | 0 | 0 | 9 |
| S2 | 0 | 30 | 6.0 | 51 |
| S3 | 20 | 30 | 13.6 | 65 |
| S4 | 40 | 30 | 16.1 | 63 |
| S5 | 60 | 30 | 19.6 | 70 |
| S6 | 0 | 45 | 10.6 | 75 |
| S7 | 20 | 45 | 18.8 | 83 |
| S8 | 40 | 45 | 25.0 | 92 |
| S9 | 60 | 45 | 28.4 | 89 |
| S10 | 0 | 60 | 11.9 | 101 |
| S11 | 20 | 60 | 22.9 | 123 |
| S12 | 40 | 60 | 28.5 | 127 |
| S13 | 60 | 60 | 30.7 | 128 |

TABLE 4

| Sample | L* | -a* | b* | h | C | ΔE | Green Color | Color Uniformity | Acceptance |
|---|---|---|---|---|---|---|---|---|---|
| Fresh Peas | 46.2 | 18.8 | 40.6 | 65.1 | 44.7 | — | — | — | — |
| S1 | 54.7 | 4.2 | 42.9 | 84.4 | 43.1 | 17.0 | 1.1 | 6.0 | 1.4 |
| S2 | 54.5 | 5.7 | 42.2 | 82.3 | 42.6 | 15.6 | 2.7 | 4.6 | 2.4 |
| S3 | 55.0 | 7.2 | 41.0 | 80.0 | 41.6 | 14.6 | 3.8 | 4.2 | 3.5 |
| S4 | 55.3 | 8.1 | 41.0 | 78.9 | 41.8 | 14.1 | 4.1 | 4.6 | 3.9 |
| S5 | 55.0 | 9.1 | 40.8 | 77.5 | 41.8 | 13.1 | 5.3 | 4.7 | 4.4 |
| S6 | 54.5 | 6.5 | 42.4 | 81.3 | 42.9 | 15.0 | 3.3 | 3.8 | 2.8 |
| S7 | 55.0 | 8.2 | 40.9 | 78.7 | 41.7 | 13.9 | 4.0 | 3.9 | 3.4 |
| S8 | 54.6 | 9.4 | 40.9 | 77.0 | 41.9 | 12.6 | 5.3 | 4.6 | 4.4 |
| S9 | 54.9 | 10.1 | 40.7 | 76.1 | 41.9 | 12.3 | 5.6 | 4.7 | 4.5 |
| S10 | 53.9 | 7.5 | 41.4 | 79.7 | 42.1 | 13.7 | 4.0 | 3.9 | 3.4 |
| S11 | 54.9 | 9.9 | 40.6 | 76.3 | 41.7 | 12.5 | 5.8 | 4.9 | 4.9 |
| S12 | 53.5 | 11.7 | 39.7 | 73.6 | 41.4 | 10.2 | 6.3 | 5.5 | 5.6 |
| S13 | 55.1 | 12.0 | 40.1 | 73.3 | 41.8 | 11.2 | 6.6 | 5.3 | 5.6 |

As would be expected, the amount of $Zn^{2+}$ in the blanch water had a significant effect on the amount of ZnPa complexes formed and the total $Zn^{2+}$ ions present in the final product. Likewise, the use of a pre-blanch hold significantly increased the zinc uptake as well as ZnPa formation. Corresponding improvements in color were also observed, particularly the green color (-a*) and hue values, as well as the total color difference values (ΔE). This latter parameter reflects the difference in overall color between the processed peas and fresh peas, and a lower ΔE value is therefore desired. The panel scores also followed this trend, as the best results were obtained with the longest pre-blanch holds utilizing the highest $Zn^{2+}$ concentration in the blanch. The $Zn^{2+}$ concentrations in the optimally-colored samples, however, exceeded FDA limits (75 ppm). Applicants believe that one contributing factor to the lower acceptance scores was color uniformity, and thus the overall acceptance could be readily improved by discarding yellow or "blonde" peas prior to processing. In this fashion, acceptable color acceptance can be achieved while remaining within the FDA limits on $Zn^{2+}$ concentrations. Yearly growing conditions also affect pea color, and the peas used were cultivated from a crop which may have been more susceptible to off-color peas. Regardless, Applicants testing has clearly shown that significant improvements in pea color can be obtained by using a pre-blanch hold at an elevated temperature for a predetermined period of time.

Based on their testing employing a pre-blanch hold, Applicants believe that improved results can be obtained by holding the vegetables at an elevated temperature for a predetermined period of time prior to further processing, regardless of the other process parameters. Preferably, the vegetables are held at a temperature of between about 60° C. and about 100° C., for between about 10 and about 30 minutes. More preferably, the pre-blanch hold for green beans is at about 77° C. for about 30 minutes, and that for peas is at about 93° C. for about 20 minutes. The pre-blanch hold is preferably performed in distilled water, although steam may also be employed. The other preferred parameters are as follows:

Green Beans:
  Blanch temp.: between about 60° C. and about 100° C. most preferably about 77° C.
  Blanch duration: between about 2 and about 10 minutes most preferably about 7 minutes
  $Zn^{2+}$ conc. in blanch: between about 500 and about 1200 ppm most preferably about 800 ppm (may vary depending upon bean maturity)
  Sterilization temp.: between about 116° C. and about 132° C. most preferably about 127° C.
  Sterilization duration: between about 10 and about 30 minutes most preferably about 17 minutes Peas:
  Blanch temp.: between about 60° C. and about 100° C. most preferably about 93° C.
  Blanch duration: between about 2 and about 10 minutes most preferably about 5 minutes $Zn^{2+}$ conc. in blanch: between about 30 and about 60 ppm most preferably about 45 ppm (may vary depending upon pea maturity)

Sterilization temp.: between about 116° C. and about 132° C. most preferably about 132° C.

Sterilization duration: between about 10 and about 30 minutes most preferably about 20 minutes It should be kept in mind, however, that significant improvements in the green color of the vegetables are obtained whenever a pre-blanch hold at elevated temperature precedes blanching in a solution containing zinc or copper ions, regardless of the other process parameters employed. The pH of the hold, blanch and brine solutions is not critical, as long as they are held within reasonable limits. Preferably, however, the pH of all solutions is between about 5.0 and about 5.5. In addition, deionized water is preferred for all solutions.

As will be discussed in more detail further herein, green beans may also benefit from the use of a pre-sterilization hold (preferably in deionized water). The pre-sterilization hold temperature may range from about 77° to about 100° C., and preferably is about 88° C. The duration of this pre-sterilization hold may range from about 15 to about 60 minutes, preferably about 45 minutes. A pre-sterilization hold generally has little or no effect on the color of peas, however.

It should also be noted that the use of an extended blanch wherein zinc or copper ions are provided in the blanch solution, will also improve the green color of the vegetables. Applicant's testing, however, has shown that with the use of this method it is not always possible to achieve an acceptable green color while meeting the 75 ppm limit set by the FDA for zinc concentration in canned foods. In addition, merely increasing the time and/or temperature of the zinc blanch is problematic, as higher concentrations of zinc must be employed and therefore it is difficult to control the final zinc concentration of the canned vegetables. More importantly, applicants have found that the use of a pre-blanch hold is preferred when the zinc or copper ions are provided in the blanch solution, as significant improvements in the overall green color are observed. These improvements are over and above what can be achieved by merely using an extended blanch in a zinc or copper ion containing solution.

Example 3

Previous attempts at employing metal ions in the brine solution into which peas are packed have not been successful, as testing has shown that peas do not readily absorb the ions from the brine. One would like to incorporate zinc in the brine in order to improve the green color of vegetables, however, as the total $Zn^{2+}$ concentration can be more precisely controlled. This is particular important due to the strict FDA regulations concerning food additives such as zinc. Applicants have also discovered that the use of an extended blanch (i.e., blanching for a longer period of time than that normally required) will improve the green color of vegetables canned with zinc-containing brine solutions. In fact, Applicants have found that this method is actually preferred over that described previously (a pre-blanch hold followed by blanching in a copper or zinc ion-containing solution), as it is much easier to control the final zinc or copper ion concentration when these ions are provided in the brine solution.

Dual cultivar peas (500 grams) were blanched in deionized water (15.0 L) at 100° C. for 3, 10, 20, or 30 minutes. The blanched peas (280 grams) were then packed into #303 X 406cans and covered with 200 mL of a $ZnCl_2$ brine solution containing 180 ppm $Zn^{2+}$ at 100° C. The brine traction in each can was 0.42 mL of brine per gram of the total weight of peas and brine. This resulted in a $Zn^{2+}$ concentration of approximately 75 ppm in the final product, which is the limit set by the FDA. The cans were mechanically sealed and heated without agitation in a steam retort at 116° C. for 35 minutes. Process time was accumulated after the retort reached the processing temperature (approximately 2 minutes come-up time). The cans were then cooled under flowing cold water. The analytical methods for pigment concentration, $Zn^{2+}$ concentration, and colorimetry were as previously described, and the results are shown in Table 5 below. It should be noted that the $Zn^{2+}$ concentration noted in Table 5 is that present in the peas, and does not include the portion present in the brine (total zinc concentration was approximately 75 ppm). The control represents peas blanched at 100° C. for 3 minutes and packed in deionized water (no $ZnCl_2$) prior to sterilization.

TABLE 5

| Sample | Blanch Time (min.) | $Zn^{2+}$ (ppm)$^2$ | ZnPa (nMol/g)$^2$ | Color (-a*) |
|---|---|---|---|---|
| Control | 3 | 11 | — | 4.2 |
| B1 | 3 | 119 | 7.9 | 6.7 |
| B2 | 10 | 122 | 10.5 | 7.5 |
| B3 | 20 | 126 | 11.7 | 7.8 |
| B4 | 30 | 125 | 12.5 | 7.9 |

The results in Table 5 indicate that an extended blanch (i.e., longer than the typical 3 minute blanch needed for blanching at 100° C.) increases zinc uptake and zinc complex formation, and also improves the color of the peas. These improvements can be attributed to the cellular heat damage and increased permeability of pea tissue caused by the extended blanch, and are similar to the results obtained previously with a pre-blanch hold followed by blanching in a $ZnCl_2$ solution. The process of this example, however, provides for greater control over the total zinc concentration in the final product.

Example 4

The procedures of Example 3 were repeated, however the blanch and sterilization times were further varied. Additionally, the sterilization temperature was increased to 132° C., as previous tests had indicated that peas processed at this temperature were more uniformly colored than those processed at 121° or 127° C. The results of this testing are shown in Table 6 below.

TABLE 6

| | Blanch Time (min.) | Green Color (-a*) Retort Time (min.) | | |
|---|---|---|---|---|
| Sample | | 10 | 20 | 30 |
| B5 | 3 | 6.2 | 6.6 | 6.6 |
| B6 | 10 | 7.1 | 7.2 | 7.7 |
| B7 | 20 | 7.7 | 8.2 | 8.7 |
| B8 | 30 | 7.9 | 8.6 | 8.8 |

Once again these results clearly indicate the benefits of an extended blanch, even when the sterilization time is further increased. Although the longest blanch and retort times produced the best coloration in the peas, the peas did have a scorched flavor. This flavor was not noted, however, in peas blanched for 20 minutes and sterilized for 20 minutes, and thus these conditions were considered ideal. Further testing also indicated that best results are obtained when deionized water is used for both the blanch and brine solutions, however blanching in deionized water may be commercially impractical.

The effect of a high temperature, pre-sterilization hold was also examined, as this step is currently used in the Veri-Green process to improve the color of green beans. The use of a pre-sterilization hold at 93° C. for 30 or 60 minutes only slightly improved the color of peas processed with a normal blanch time (3 minutes), however the color was still inferior to that obtained when a 30 minute extended blanch (as previously described) was employed without the use of a pre-sterilization hold. A high temperature, pre-sterilization hold had no effect on peas which were subjected to an extended blanch.

Example 5

The effect of an extended blanch on green beans was also examined using methods similar to those described in Example 4. Green beans were blanched in deionized water at 77° C. for either 3 or 30 minutes. Next, the beans were packed in a $ZnCl_2$ brine solution (150 ppm $Zn^{2+}$) prepared with either deionized or untreated water (100° C.). The use of a 150 ppm $Zn^{2+}$ brine solution resulted in a final product (brine+peas) containing 75 ppm $Zn^{2+}$ (the FDA limit). The cans were sealed, and the beans subjected to sterilization at 123° C. for 12.4 minutes. An optional pre-sterilization hold at 93° C. (as described in Example 4) was also employed in some of the samples. The analytical methods were as previously described, and the results are shown in Table 7 below.

TABLE 7

| Sample | Blanch Time (min.) | Pre-Steril. Hold (min.) | Color (-a*) | |
| --- | --- | --- | --- | --- |
| | | | Deionized $H_2O$ brine | Untreated $H_2O$ brine |
| G1 | 3 | 0 | 7.5 | 5.8 |
| G2 | 30 | 0 | 8.8 | 6.9 |
| G3 | 3 | 45 | 10.2 | 8.0 |
| G4 | 30 | 45 | 12.0 | 9.8 |

Similarly to peas, significant improvements in color were seen by the employment of an extended blanch time, regardless of water quality or the use of a pre-sterilization hold. In addition, the use of deionized water in the brine once again improved the color. While one would ideally use deionized water for both blanch and brine solutions, economics may dictate the use of untreated water for the blanch step and acceptable results were obtained by this method. Contrary to peas, however, a pre-sterilization hold did indeed provide a significant color improvement over and above that provided by an extended blanch and/or deionized water. The use of an extended blanch and a pre-sterilization hold also improved the color uniformity of the beans, as the color of the cut ends and the middle of the beans were more closely matched. The differences in effect of a pre-sterilization hold on peas and green beans may be explained by the fact that pea tissue is generally more permeable to $Zn^{2+}$ ions compared to green beans, and thus the pre-sterilization hold is not needed for optimum zinc uptake in peas. Further testing also again indicated that increases in the sterilization temperature and time affected the overall color, however these increases were limited by affects on the flavor.

Based upon Applicants' testing, it is clear that improvements in the green color of vegetables such as green beans and peas can be linked directly to the use of an extended blanch (i.e., longer than that typically required for blanching purposes only). Preferably the extended blanch is performed at a temperature of between about 60° C. and about 100° C., for between about 10 and about 30 minutes. Blanching may be accomplished by either placing the vegetables in deionized water at the appropriate temperature, or by bathing the vegetables in steam. Improved coloration is obtained regardless of the other process parameters as long as this extended blanch is employed prior to sterilization in a zinc or copper-ion containing brine. Regardless, the presently preferred ranges for other process parameters are as follows:

Green Beans:
  Total $Zn^{2+}$ concentration in canned product: about 75 ppm
  Optional pre-sterilization hold temp.: between about 77° C. and about 100° C.
  Pre-sterilization hold duration: between about 15 and about 60 minutes
  Sterilization temp.: between about 116° C. and about 132° C.
  Sterilization duration: between about 10 and about 30 minutes More preferably, the parameters for green beans are as follows:
  Blanch Temperature: about 77° C.
  Blanch Duration: about 30 minutes
  Total $Zn^{2+}$ concentration in canned product: about 75 ppm
  Optional pre-sterilization hold temp.: about 88° C.
  Pre-sterilization hold duration: about 45 minutes
  Sterilization temp.: about 127° C.
  Sterilization duration: about 17 minutes Peas:
  Total $Zn^{2+}$ concentration in canned product: about 75 ppm
  Sterilization temp.: between about 116° C. and about 132° C.
  Sterilization duration: between about 10 and about 30 minutes More preferably, the parameters for peas are as follows:
  Blanch Temperature: about 93° C.
  Blanch Duration: about 20 minutes
  Total $Zn^{2+}$ concentration in canned product: about 75 ppm
  Sterilization temp.: about 132° C.
  Sterilization duration: about 20 minutes It should be kept in mind, however, that improvements in the green color of vegetables are obtained whenever an extended blanch and zinc or copper-containing brine are employed, regardless of the other process parameters. Once again, deionized water is preferred for all solutions, and, as discussed previously, pH is not critical but is preferably between about 5.0 and about 5.5.

Having shown and described the preferred embodiments of the present invention, further adaptations of the method described herein can be accomplished by appropriate modifications by one of ordinary skill in the art without departing from the scope of the present invention. Several of such potential modifications have been mentioned, and others will be apparent to those skilled in the art. For example, copper ions can be substituted for zinc ions, and, in fact, copper complexes form more easily and are more stable. In addition, other zinc or copper compounds other than those specifically mentioned can be employed. Accordingly, the scope of the present invention should be considered in terms of the following claims and is understood not to be limited to the details of the process shown and described in the specification.

What we claim is:

1. A method for improving the color of containerized green vegetables, comprising the steps of:

(a) blanching the vegetables for at least 10 minutes at a temperature between about 60° and about 100° C.;

(b) packing the blanched vegetables into a container along with an aqueous packing solution containing zinc or copper ions;

(c) sealing said container; and (d) subjecting said containerized vegetables and packing solution to a sterilization process.

2. The method of claim 1, wherein the vegetables are blanched in water.

3. The method of claim 1, wherein the vegetables are blanched in steam.

4. The method of claim 1, wherein said packing solution in which said vegetables are packed comprises deionized water, and zinc chloride.

5. The method of claim 4, wherein said vegetables are peas.

6. The method of claim 4, wherein said vegetables are green beans.

7. The method of claim 5, wherein the concentration of zinc ions in said packing solution is at least about 100 ppm.

8. The method of claim 6, wherein the concentration of zinc ions in said packing solution is at least about 100 ppm.

9. The method of claim 5, wherein said wherein said blanching is performed at a temperature between about 60° and about 100° C., for at least about 20 minutes.

10. The method of claim 6, wherein said wherein said blanching is performed at a temperature between about 60° and about 100° C., for at least about 30 minutes.

11. The method of claim 1, further comprising the step of holding the containerized vegetables at an elevated temperature for a predetermined period of time prior to said sterilization process.

12. A method for improving the color of containerized green vegetables, comprising the steps of:

(a) holding the vegetables at a temperature of at least about 60° C. for at least about 10 minutes in an aqueous solution;

(b) blanching the vegetables with an aqueous blanching solution containing zinc or copper ions (c) packing the blanched vegetables into a container along with an aqueous packing solution;

(d) sealing said container; and (e) subjecting said containerized vegetables and packing solution to a sterilization process.

13. The method of claim 12, wherein said holding step is accomplished by placing the vegetables in water.

14. The method of claim 12, wherein said holding step is accomplished by bathing said vegetables in steam.

15. The method of claim 13, wherein said blanching solution comprises water and zinc chloride.

16. The method of claim 15, wherein said vegetables are green beans.

17. The method of claim 15, wherein said vegetables are peas.

18. The method of claim 16, wherein said zinc concentration in said blanching solution is at least about 500 ppm.

19. The method of claim 17, wherein said zinc concentration in said blanching solution is at least about 30 ppm.

20. The method of claim 15, wherein said holding step is accomplished by placing the vegetables in water at a temperature of between about 60° C. and about 100° C., for at least about 10 minutes.

* * * * *